Aug. 15, 1950          A. M. JOCHIM          2,519,136
ROCK PICKER
Filed May 21, 1947          2 Sheets-Sheet 2
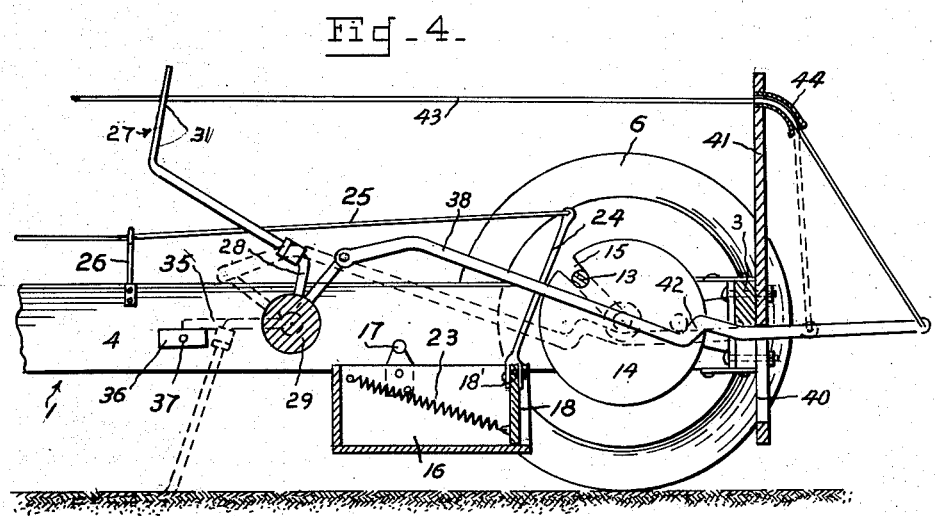
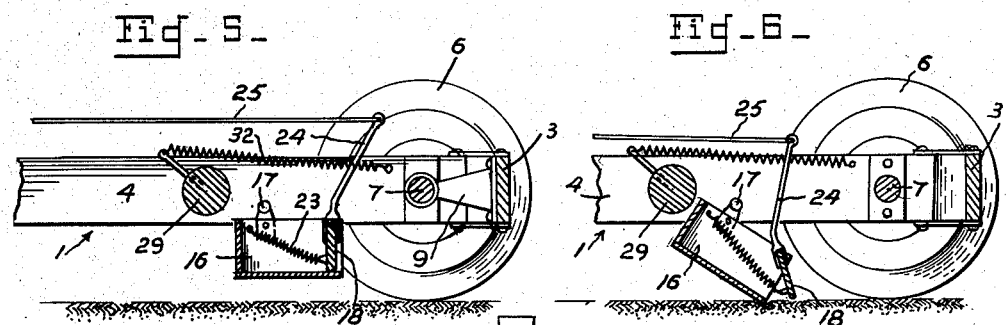
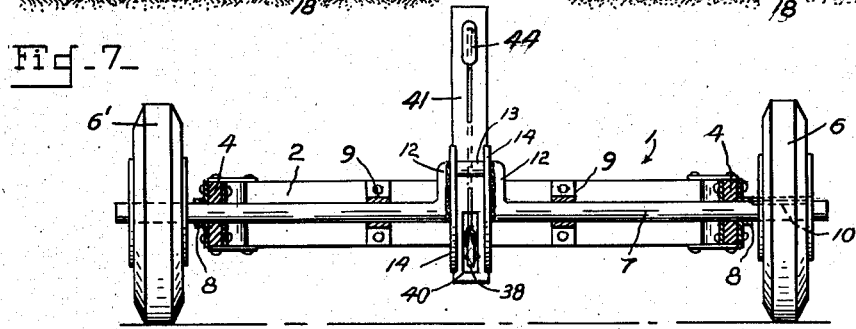
Inventor:
Anton M. Jochim,
Attorney.

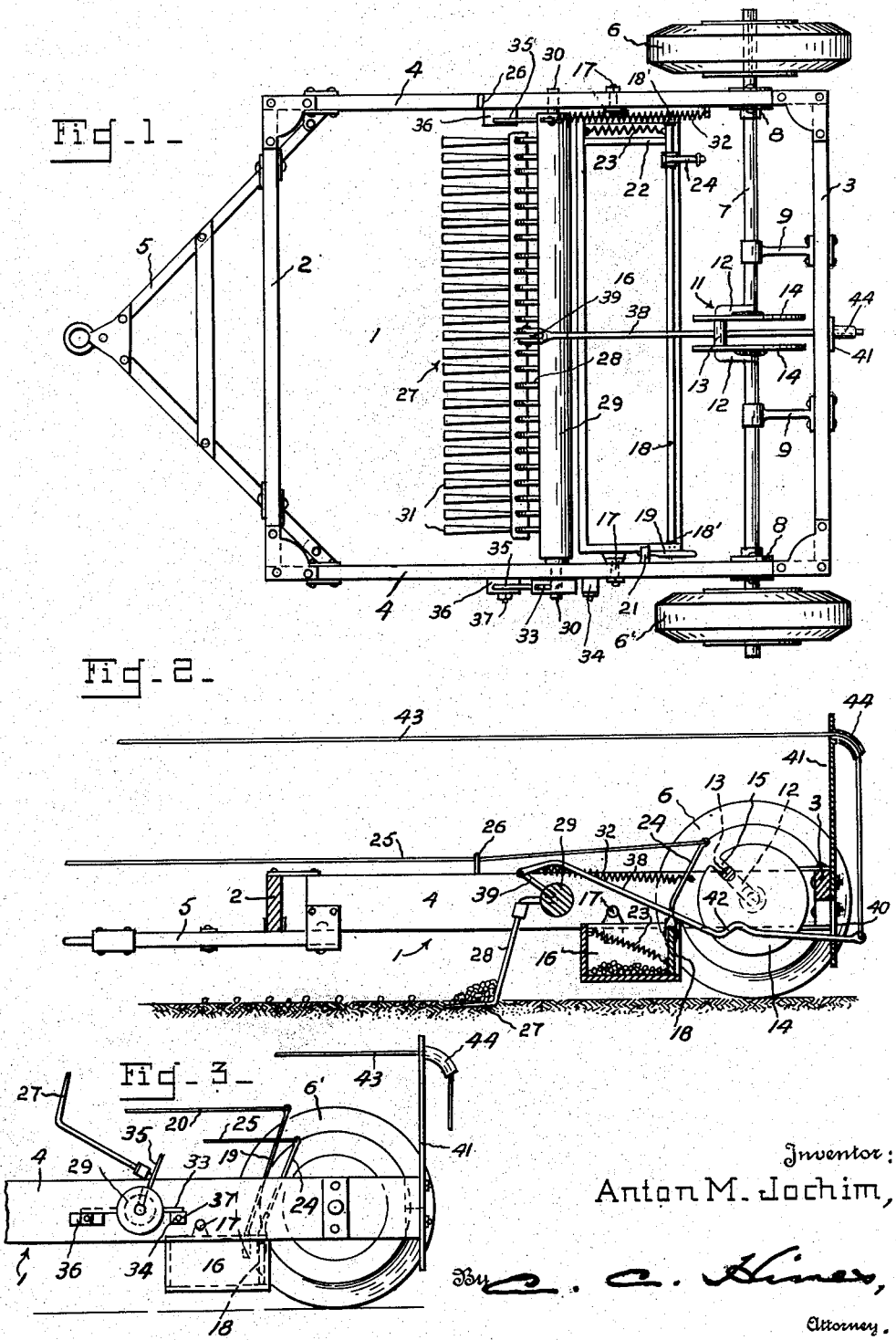

Patented Aug. 15, 1950

2,519,136

UNITED STATES PATENT OFFICE 2,519,136

ROCK PICKER

Anton M. Jochim, Inverness, Mont., assignor to Minn-Kota Manufacturing Company, Moorhead, Minn.

Application May 21, 1947, Serial No. 749,578

12 Claims. (Cl. 55—17)

This invention relates to a rock picker for gathering loose rocks from a ground surface or field, transporting the gathered rocks to a point of deposit in the field or elsewhere, and dumping the gathered rocks at the deposit point.

One object of the invention is to provide a simple, reliable and efficient construction of machine whereby the loose rocks may be readily gathered, delivered to a gathering hopper or receptacle, and dumped when the receptacle is filled to a desired extent, and which is of sturdy type and adapted to operate without liability of injury to its working parts.

Another object of the invention is to provide a rock picker which may be drawn from a tractor or by other draft means, and which may be readily controlled in operation from a driver's seat.

The invention consists of the novel construction, combination and arrangement of parts hereinafter fully described and claimed, and as shown in the accompanying drawings, in which:

Fig. 1 is a top plan view of a rock picker embodying my invention, showing the rake lowered and in gathering position.

Fig. 2 is a vertical, longitudinal section through the same.

Fig. 3 is a fragmentary side elevation showing the rake raised to delivery position and illustrating in full and dotted lines certain stop features for limiting the upward and downward movements of the rake.

Fig. 4 is a view similar to Fig. 2 showing in full and dotted lines different positions of the rake and its operating and controlling means.

Fig. 5 is a vertical longitudinal section through the rear portion of the picker, parts being omitted, showing the gathering receptacle in receiving position.

Fig. 6 is a view similar to Fig. 5, showing the gathering receptacle dumped or in its discharging position.

Fig. 7 is a vertical transverse section through the picker looking rearwardly and taken substantially along the line of the transverse shaft or axle.

In carrying my invention into practice, I provide a traveling vehicle embodying a wheeled frame 1 formed of angle metal or other suitable material and comprising a front cross bar 2, a rear cross bar 3 and longitudinal side bars 4, which are suitably joined together. At the front of this frame is arranged a tongue or draft member 5 whereby the picker is adapted to be drawn by a draft animal or may be attached to a tractor so as to be drawn thereby. The forward portion of the picker is supported in travel by the draft animal or tractor, and at its rear end the picker is mounted on wheels 6, 6' carried by a transverse shaft or axle 7 journaled in bearings 8 on the side bars 4 and in bearing and bracing members 9 fastened to the rear cross bar 3. The wheel 6 is keyed, as shown at 10, to the shaft to rotate the shaft in the travel of the picker; while the wheel 6' turns loosely on the shaft so that the wheels may revolve differentially to allow the picker to readily turn curves and to be otherwise easily steered. In its travel the frame 1 is disposed horizontally at a predetermined level above the ground surface from which the rocks are to be picked. The shaft 7 is provided at an intermediate point between the side bars 4 with a U-shaped crank 11 embodying side arms 12 and a cross arm 13. To the side arms 12 of the crank are welded or otherwise rigidly secured a pair of spaced circular guide plates or disks 14. These disks are provided at a point in their periphery with radial slots 15 extending inwardly a certain distance toward the shaft center and through these slots extends the cross arm 13 of the crank 11, which crosses the gap between the disks at a point inwardly spaced from the peripheries of the disks.

A gathering box or receptacle 16 is arranged between the side bars 4 adjacent to and in advance of the shaft 7. This box is of oblong rectangular form and pivotally suspended as at 17, from the side bars to tilt downwardly and rearwardly from its horizontal receiving position shown in Figs. 2, 4 and 5 to its dumping position shown in Fig. 6. The box is normally open at its top and rear portion and adapted to be closed at the rear by a gate 18 hinged at the ends of its upper edge, as at 18', to the ends of the box to swing outward from its closed position shown in Figs. 2, 4 and 5, to its open position shown in Fig. 6. The box pivots 17 are preferably arranged at points slightly in advance of its longitudinal center so that the box normally tends to tilt downwardly and rearwardly by gravity to dumping position. To one end of the box is fixed an elevating or holding arm or lever 19 to which is attached the rear end of a rope or cable 20 which extends forwardly to a position adjacent to the driver's seat on the tractor, where its forward end may be temporarily secured at times when it is desired to hold the box elevated during a rock picking operation and until it is desired to dump the collected rocks, or at times when the picker is not in use and is being transported from place to place. A stop 21 is provided on the frame to limit the forward movement of the arm or lever 19. By releasing this rope or cable the box will automatically drop to dumping position under its tendency to tilt assisted by the weight of the collected rocks therein. Arranged adjacent one end of the box and spaced therefrom is a false end or partition 22 providing a protecting compartment to enclose a spring 23 attached to the gate 18 and front of the box and which acts normally to hold the gate closed. An arm or lever 24 is attached to the gate and has attached thereto the rear end of a releasing rope or cable 25 which extends forwardly through a guide 26 to a point adjacent the driver's seat of the tractor where it may be secured against displacement. By pulling on this rope or cable the operator, after tilting the box to dumping position, may fully open the end gate to discharge the gathered rocks at the point of deposit.

The picking or gathering means employed comprises a rake 27 formed of spaced rods 28 fixed at their upper rear ends to a transverse rock shaft 29 having end spindles 30 journaled in the side bars 4, said rods being provided at their forward or free ends with teeth or tines 31 bent at an angle thereto and extending forwardly therefrom. The arrangement of these teeth or tines is such that, in the gathering position of the rake, as shown in Figs. 1, 2 and 4, the teeth or tines will travel at a slight gathering angle along or just below the surface of the ground, so that, in the forward travel of the picker, all loose rocks on or close to the surface will be taken up by the tines. By rotation of the shaft 29, the rake may be swung upwardly and rearwardly to its discharge position shown in Fig. 4, to deliver the gathered rocks to the box 16, which operation may be assisted by the action of a spring 32 connecting the shaft 29 with one of the frame bars 4, the weight of the rake, when its load is delivered and it is free to move, being sufficient to swing it back to its normal gathering position. On one end of the shaft 29 is a stop arm 33 engageable with a bumper 34 on the adjacent bar 4 to limit the rearward swinging movement of the rake, and at each end of the rake is a stop arm 35 engageable with a bumper 36 on the adjacent bar 2 to limit the forward swinging movement of the rake. These bumpers are secured by bolt and nut fastenings 37 to adapt them to be angularly adjusted. The adjustability of the bumpers 36 is such that the rake may be held elevated above the ground surface when the picker is not in use and is being transported from place to place.

A device is provided, which is actuable by the crank 11, for dumping the box 16 when filled to discharge the gathered rocks. This device consists of a rod 38 coupled at its forward end to a crank arm 39 on the shaft 29 and extending therefrom rearwardly beneath the shaft 7 and having its rear end projecting at the rear of the frame 1 through a slot 40 in a bracket 41 secured to and projecting below and above the plane of the frame bar 3. The rod 38 extends between the lower edges of the disks 14 and is provided with an offset portion 42 forming a contact shoulder adapted to be engaged by the cross arm 13 of the crank 11, whereby motion is transmitted to the rod to move the rake to delivery position. In the normal position of the rod 38, i. e., the position it occupies when the rake is in gathering position, the rod rests at its rear end on the bottom wall of the guide slot 40, whereby its downward movement is limited, and in this position of the rod the shoulder lies in the space between the lower portions of the disks 14 below and out of the path of travel of the crank part 13. Hence in the travel of the vehicle and while the rake is picking up a load of rock, the rod 38 will remain inoperative. A controlling rope or cable 43 is attached at one end to the rear end of the rod and thence extends upwardly and forwardly through a guide 44 on the bracket 41 to a point adjacent the driver's seat on the tractor where its forward end is disposed in convenient position for manipulation. When a sufficient supply of rock has been gathered by the rake the operator pulls on the rope 43 to raise the rear end of the rod in the slot 40 and to bring the shoulder 42 into the path of travel of the crank part 13. The crank part 13 will thereupon engage the shoulder at a point in advance of the vertical center of the shaft, as shown in Fig. 2, and move the rod rearwardly until crank part 13 reaches a position in rear of the shaft 7 at which the crank part 13 begins to move upwardly and away from and release the shoulder, as shown in Fig. 4. During this action the operator retains hold of the cable 43 and continues to pull on the cable to keep the shoulder 42 in contact with the crank part 13 and to raise the rod until, at the time the crank part 13 releases the shoulder, the rod engages the top wall of the slot 40.

During the above described movements of the parts 13, 38 and 43, the rake is elevated and discharges its load into the box 16. The operator then releases the cable 43 and the rake and rod drop by gravity back to normal position. The described movements of the parts 13, 38 and 43 may be repeated until the box is filled and it is desired to dump its load. The operator then successively releases the rope 20 and pulls upon the rope 25 to allow the box to drop down and to open the gate 18 to discharge the load. The box is then raised to normal position, in which action the gate is automatically closed.

From the foregoing description, taken in connection with the drawings, the construction and mode of operation of my improved picker may be readily understood without a further and extended description. Its advantages are that it is simple, reliable and efficient in construction, not easily subject to breakage, and it is to a large extent automatic in action. While the construction shown is preferred it will, of course, be understood that changes in the form, construction and arrangement of parts may be made, within the scope of the appended claims, without departing from the spirit or sacrificing any of the advantages of the invention.

Having thus described my invention, I claim:

1. A rock picker comprising a traveling vehicle having a shaft driven in the travel of the vehicle, said shaft being provided with a crank projection, a receptacle on the vehicle, a rake having a crank arm and mounted on the vehicle for movement from a rock gathering position to a position for the delivery of gathered rocks to the receptacle, a vertically and longitudinally movable motion transmitting rod arranged below the shaft and normally lying out of the path of rotation of the crank projection, said rod being pivoted at its forward end to said crank arm and provided with a shoulder adapted to be brought by upward movement of the rod into engagement with the crank projection for operation thereby to move the rake from gathering position to delivery position, guiding means on the vehicle engaged by the rear end of the rod, and means connected with the rear end of the rod for raising and lowering the same to move the shoulder into and out of the path of the crank projection.

2. A rock picker comprising a traveling vehicle having a shaft driven in the travel of the vehicle, said shaft being provided with a crank projection, a receptacle on the vehicle, a rake pivotally mounted on the vehicle for swinging movements from a rock gathering position to a position for delivering gathered rocks to the receptacle, and vice versa, a normally inactive vertically and longitudinally movable motion transmitting rod pivotally coupled at one end to the rake and having an engaging portion normally lying out of the path of rotation of the crank projection but adapted to be brought into engagement therewith for longitudinal movement of the rod thereby to swing the rake from gathering to delivery position, and means coupled to the opposite end of the rod for moving the rod upwardly and downwardly into and out of operating position.

3. A rock picker comprising a traveling vehicle having a shaft driven in the travel of the vehicle, said shaft being provided with a crank projection, a receptacle on the vehicle, a rake mounted on the vehicle for movement from a rock gathering position to a position for the delivery of gathered rocks to the receptacle, a vertically and longitudinally movable rod pivotally coupled at one end to the rake and in vertical and longitudinal engagement at its opposite end with the vehicle frame, said rod being arranged below the shaft and having a shoulder normally lying out of the path of rotation of the crank projection but adapted to be brought by the upward movement of the rod into the path of movement of said crank projection for operation of the rod thereby to shift the rod longitudinally and move the rake from gathering position to delivery position, and means for raising and lowering the rod to move its shoulder into and out of the path of travel of the crank projection.

4. A rock picker comprising a traveling vehicle including a frame having a rear end portion provided with a vertical guide slot, a shaft mounted on the frame in advance of said rear end portion and driven in the travel of the vehicle, said shaft being provided with a crank projection, a receptacle on the vehicle in advance of the shaft, a rake pivotally mounted on the vehicle for swinging movements from a rock gathering position to a position for delivering gathered rocks to the receptacle, and vice versa, a motion transmitting device comprising a rod extending beneath the shaft longitudinally of the vehicle and pivotally coupled at its forward end to the rake and having its rear end engaging said guide slot, the rod being provided between its end with a shoulder normally lying below and out of the path of rotation of the crank projection but adapted to be brought by upward movement of the rod into engagement with the crank projection for operation thereby to swing the rake from gathering to delivery position, and means connected with the free end of the rod for swinging the rod upward and downward into and out of operating position.

5. A rock picker comprising a traveling vehicle having a shaft driven in the travel of the vehicle, said shaft having a U-shaped crank projecting radially therefrom, spaced guide disks secured to the side arms of the crank, a receptacle on the vehicle, a rake mounted on the vehicle for movement from a rock gathering position to a position for the delivery of gathered rocks to the receptacle, a vertically and longitudinally movable rod extending lengthwise of the vehicle and beneath the shaft and pivotally connected at its forward end to the rake and having a shoulder portion lying between the disks and out of the path of travel of the cross piece of the crank but adapted to be brought into engagement therewith by upward movement of the rod for longitudinal movement of the rod by the crank, to move the rake from gathering position to delivery position, means for guiding the free end of the rod in the movements of the rod, and means connected to said free end of the rod for moving the rod upwardly to bring its shouldered portion into the path of the crank or permitting it to drop downwardly out of engagement with the crank.

6. A rock picker comprising a traveling vehicle frame, a shaft journaled on the frame and provided with a crank, supporting wheels, one loose on the shaft and the other fixed to the shaft to drive the same, a receptacle on the frame, a rake pivotally mounted on the frame for swinging movements from a rock gathering position to a position for delivering gathered rocks to the receptacle, and vice versa, a normally inactive vertically and longitudinally movable motion transmitting rod coupled to the rake and having a shoulder to engage the crank, said rod being movable upward and downward to dispose the shoulder into and out of the path of travel of the crank and movable longitudinally by engagement of the crank with the shoulder to swing the rake from gathering to delivery position.

7. A rock picker comprising a traveling vehicle, a pivotally mounted receptacle on the vehicle having an outlet and normally movable from a horizontal receiving position to a downwardly and rearwardly inclined dumping position, and releasing it for a dumping action, a gate for closing the outlet of the receptacle, means connected to the gate swinging the receptacle from receiving to dumping position, and vice versa, and simultaneously opening and closing the gate, and means operative in the travel of the vehicle for picking up rocks from the surface of the ground and delivering the same to the receptacle.

8. A rock picker comprising a traveling vehicle, a pivotally mounted receptacle on the vehicle having an outlet and normally movable from a horizontal receiving position to a downwardly and rearwardly inclined dumping position, a gate for closing the outlet of the receptacle, a spring for normally holding the gate closed, means connected to the gate for swinging the receptacle from gathering to delivery position and simultaneously and as part of such movements opening and closing the gate, and means operative in the travel of the vehicle for picking up rocks from the surface of the ground and delivering the same to the receptacle.

9. A rock picker comprising a traveling vehicle, a pivotally mounted receptacle on the vehicle having an outlet and normally movable from an elevated receiving position to a downwardly and rearwardly inclined dumping position, a gate for closing the outlet of the receptacle, a spring for normally holding the gate closed, an arm attached to the gate, a pull rope attached to the arm whereby the receptacle may be swung from receiving to delivery position, and vice versa, and the gate simultaneously opened and closed, and means operative in the travel of the vehicle for picking up rocks from the surface of the ground and delivering the same to the receptacle.

10. A rock picker, comprising a traveling vehicle, a pivotally mounted receptacle on the vehicle having an outlet and normally movable by gravity from a horizontal receiving position to a downwardly and rearwardly inclined dumping position, a pivoted gate for closing the outlet of the receptacle, means acting on the gate for normally holding it closed and permitting it to be opened, an arm attached to the gate, a pull rope attached to the arm whereby the receptacle may be held in receiving position and the gate held closed and whereby the receptacle may be released for a dumping action and the gate simultaneously forced by the arm to open position, and means operative in the travel of the vehicle for picking up rocks from the surface of the ground and delivering the same to the receptacle.

11. A rock picker comprising a traveling vehicle having a driving shaft, a receptacle on the vehicle, a rake pivotally mounted on the vehicle for swinging movements from a rock gathering position to a position for delivery of gathered rocks to the receptacle, and vice versa, adjustable stop means on the rake and vehicle frame for limiting the downward movement of the rake and supporting it when desired in an elevated inoperative position, a normally inactive motion transmitting rod for swinging the rake from gathering to delivery position, means on the shaft for actuating said rod and means for rendering said rod operative or inoperative by said actuating means.

12. A rock picker comprising a traveling vehicle having a driving shaft, a receptacle on the vehicle, a rake pivotally mounted on the vehicle for swinging movements from a rock gathering position to a position for delivery of gathered rocks to the receptacle, and vice versa, stop means comprising stop arms on the rake and adjustable bumpers on the vehicle frame for limiting the downward movement of the rake and supporting it when desired in an elevated inoperative position, a normally inactive motion transmitting rod for swinging the rake from gathering to delivery position, means on the shaft for actuating said rod, and means for rendering said rod operative or inoperative by said actuating means.

ANTON M. JOCHIM.

REFERENCES CITED

The following references are of record in the file of this patent:

UNITED STATES PATENTS

| Number | Name | Date |
|---|---|---|
| 45,970 | Brewster et al. | Jan. 24, 1865 |
| 124,122 | Davis | Feb. 27, 1872 |
| 361,040 | Baker | Apr. 12, 1887 |